United States Patent [19]
Maki et al.

[11] Patent Number: 6,030,291
[45] Date of Patent: Feb. 29, 2000

[54] MANUAL CONTROL DEVICE FOR USE WITH AMUSEMENT MACHINE

[75] Inventors: Toyozo Maki, Toyonaka; Hirofumi Nagao, Kobe, both of Japan

[73] Assignee: Konami Co., Ltd., Hyogo-ken, Japan

[21] Appl. No.: 08/864,039

[22] Filed: May 28, 1997

[30] Foreign Application Priority Data

May 31, 1996 [JP] Japan ................................. 8-138598

[51] Int. Cl.[7] .................................................. G09G 1/00
[52] U.S. Cl. .............................................. 463/38; 345/161
[58] Field of Search ........................... 273/148 B, 148 R; 463/36, 37, 38; 345/156–184; 434/45

[56] References Cited

U.S. PATENT DOCUMENTS

| | | | |
|---|---|---|---|
| 5,589,828 | 12/1996 | Armstrong | 341/20 |
| 5,691,898 | 11/1997 | Rosenber et al. | 364/190 |
| 5,692,956 | 12/1997 | Rifkin | 463/37 |
| 5,721,566 | 2/1998 | Rosenberg et al. | 345/161 |
| 5,731,804 | 3/1998 | Rosenberg et al. | 345/156 |
| 5,734,373 | 3/1998 | Rosenberg et al. | 345/161 |
| 5,739,811 | 4/1998 | Rosenberg et al. | 345/161 |

FOREIGN PATENT DOCUMENTS

| | | |
|---|---|---|
| 6-246066 | 9/1994 | Japan . |
| 7-213740 | 8/1995 | Japan . |
| 8-000828 | 1/1996 | Japan . |

OTHER PUBLICATIONS

Force F/X Joystick, Popular Mechanics, pp. 70–71, Nov. 1996.

*Primary Examiner*—Valencia Martin-Wallace
*Assistant Examiner*—John Paradiso
*Attorney, Agent, or Firm*—Jordan and Hamburg LLP

[57] ABSTRACT

A manual control device for use as a joystick with a amusement machine has a control lever tiltably mounted on a support plate by a bearing and a detecting mechanism for detecting a tilting displacement of the control lever to control a displayed character or object in a video game played on the amusement machine. A stimulus imparting mechanism is actuatable depending on how a video game played by the amusement machine develops and moves the control lever to impart a stimulus through the control lever to a game player of the video game. A resistance imparting mechanism is actuatable depending on how the video game played by the amusement machine develops and imparts resistive forces to the control lever against forces applied by the game player to move the control lever.

32 Claims, 6 Drawing Sheets

MANUAL CONTROL DEVICE FOR USE WITH AMUSEMENT MACHINE

BACKGROUND OF THE INVENTION

1. Field of the Invention

The present invention relates to a manual control device for controlling a displayed character, object, or the like on the display screen of an amusement machine such as a video game machine.

2. Description of the Prior Art

Joysticks are widely used as manual control devices for controlling displayed characters, objects, etc. on the display screens of video game machines or the like.

One known joystick for use with such a video game machine is illustrated in FIG. 1 of the accompanying drawings. As shown in FIG. 1, the joystick comprises a control lever 43 pivotally supported on a frame 42 by a bearing 41, and four detector switches 44 positioned at respective equally angularly spaced locations around a lower end of the control lever 43. When the control lever 43 is manually tilted by the game player, its lower end engages and turns on one or adjacent two of the detector switches 44, so that the joystick generates an output signal, to be supplied to the video game machine, which is indicative of the direction in which the joystick is operated.

Since the function of the conventional joystick is to supply the output signal to the video game machine, the joystick itself does not provide any stimulative action, and the game player concentrates on images displayed on the display screen of the video game machine, often accompanied by sounds produced by the video game machine in timed relation to the displayed images. Only the images and sounds fail to make the game player feel realistic about the video game being played, and the game player often becomes bored due to monotonous aspects of the video game provided by the images and sounds only.

It has been customary for various video game machines to incorporate mechanisms for giving the game player a realistic feeling about video games being played. For example, a driving game machine has a driver's seat for the game player to sit in and a display monitor for displaying cars and driving courses. The driving game machine also has an actuator mechanism for mechanically swinging the driver's seat in timed relation to the movement of the simulated car driven by the game player and displayed on the display monitor while the driving game is in progress. According to another example, a shooting game machine which is played by the game player to engage in shooting combat with a character displayed on a display monitor includes a helmet including a vibrating mechanism, which is worn by the game player. When the game player is shot by the displayed character in the shooting game, the vibrating mechanism is actuated to give vibrations to the game player through the helmet. These game machines thus give the game player a certain physical action through the driver's seat or the helmet to stimulate the game player depending on how the video game develops.

The driving game machine with the actuator mechanism for mechanically swinging the driver's seat is relatively expensive to manufacture because the actuator mechanism is large in size and complex in structure. The shooting game machine with the helmet which incorporates the vibrating mechanism is also relatively complex in structure as it requires a large number of parts.

SUMMARY OF THE INVENTION

It is therefore an object of the present invention to provide a manual control device which is relatively simple in structure and capable of producing and imparting a stimulative physical action to a game player while playing with a amusement machine.

According to the present invention, there is provided a manual control device for use with a amusement machine, comprising a support plate, a control lever tiltably mounted on the support plate by a bearing, a detecting mechanism for detecting a tilting displacement of the control lever, and a stimulus imparting mechanism actuatable depending on how a video game played by the amusement machine develops, for moving the control lever to impart a stimulus through the control lever.

When the stimulus imparting mechanism is actuated in response to a control signal from a controller of the amusement machine during a video game played on the amusement machine, the control lever is moved to impart a stimulus through the control lever to the game player, who is directly given stimulative information depending on how the video game develops. The game player can thus feel highly realistic about the video game.

The stimulus imparting mechanism may comprise an eccentric weight rotatably supported on the support plate and a rotary actuator mounted on the support plate for rotating the eccentric weight. In response to a control signal from the controller, the rotary actuator is energized to rotate the eccentric weight, which vibrates the support plate and hence the control lever that imparts the vibration to the game player. The period of time in which the rotary actuator is energized may be controlled to easily and accurately control the stimulative information given to the game player.

The stimulus imparting mechanism may comprise a shaft, the support plate being swingably supported by the shaft, and a swinging mechanism for swinging the support plate about the shaft. In response to a control signal from the controller, the swinging mechanism is actuated to swing the support plate about the shaft for thereby thrusting the control lever upwardly, which imparts the stimulative information clearly to the game player. For example, the stimulative information may be imparted from the control lever to the game player when a game character controlled in the video game by the game player is greatly damaged by another game character in the video game.

According to the present invention, there is also provided a manual control device for use with a amusement machine, comprising a support plate, a control lever tiltably mounted on the support plate by a bearing, a detecting mechanism for detecting a tilting displacement of the control lever, and a resistance imparting mechanism actuatable depending on how a video game played by the amusement machine develops, for imparting resistive forces to the control lever against forces tending to move the control lever.

When the resistance imparting mechanism is actuated in response to a control signal from a controller of the amusement machine during a video game played on the amusement machine, the resistance imparting mechanism imparts resistive forces to the control lever against manual forces applied by the game player to move the control lever. Such resistive forces may also represent information given to the game player as depending on how the video game develops. Therefore, the game player who feels such resistive forces through the control lever can feel highly realistic about the video game.

The resistance imparting mechanism may comprise a coupling connected to a lower end of the control lever through a flexible joint, and an actuating mechanism for pulling the coupling downwardly to press the control lever against the bearing. When the actuating mechanism is operated in response to a control signal from a controller of the amusement machine while the video game is being played thereon, the coupling is pulled downwardly to give downward resistive forces to the control lever against manual forces tending to move the control lever. For example, when the accumulated amount of damage caused to a game character played in the video game by the game player exceeds a certain lever, the actuating mechanism is operated to pull the coupling downwardly to give downward resistive forces to the control lever. The game player who is gripping the control lever can easily and reliably recognize the fact that the game character controlled by the game player is greatly damaged.

The resistance imparting mechanism may comprise a slide plate operatively coupled to the control lever and a sliding mechanism for pulling the slide plate in a direction to tilt the control lever. When the sliding mechanism is operated in response to a control signal from a controller of the amusement machine while the video game is being played thereon, the sliding mechanism moves the sliding plate in a direction, imparting resistive forces to the control lever against manual forces applied by the game player to move the control lever in a direction opposite to that direction. The game player is thus given accurate information represented by the resistive forces depending on how the video game develops.

According to the present invention, there is further provided a manual control device for use with a amusement machine, comprising a support plate, a control lever tiltably mounted on the support plate by a bearing, a detecting mechanism for detecting a tilting displacement of the control lever, a stimulus imparting mechanism actuatable depending on how a video game played by the amusement machine develops, for moving the control lever to impart a stimulus through the control lever to a game player of the video game, and a resistance imparting mechanism actuatable depending on how the video game played by the amusement machine develops, for imparting resistive forces to the control lever against forces applied by the game player to move the control lever.

According to the present invention, there is further provided a manual control device for controlling a displayed element in a video game played on a amusement machine, comprising a tiltable control lever manually operable by a game player of the video game, a detecting mechanism for detecting a tilting displacement of the control lever to control the displayed element, a stimulus imparting mechanism actuatable depending on how the video game develops, for imparting a stimulative physical action to the manually operable control lever, and a resistance imparting mechanism actuatable depending on how the video game develops, for imparting resistive forces to the manually operable control lever against manual forces applied by the game player to move the control lever.

The manual control device further comprises a frame and a support plate mounted in the frame, the tiltable control lever being tiltably supported on the support plate through a bearing, wherein the detecting mechanism, the stimulus imparting mechanism, and the resistance imparting mechanism are mounted in the frame.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
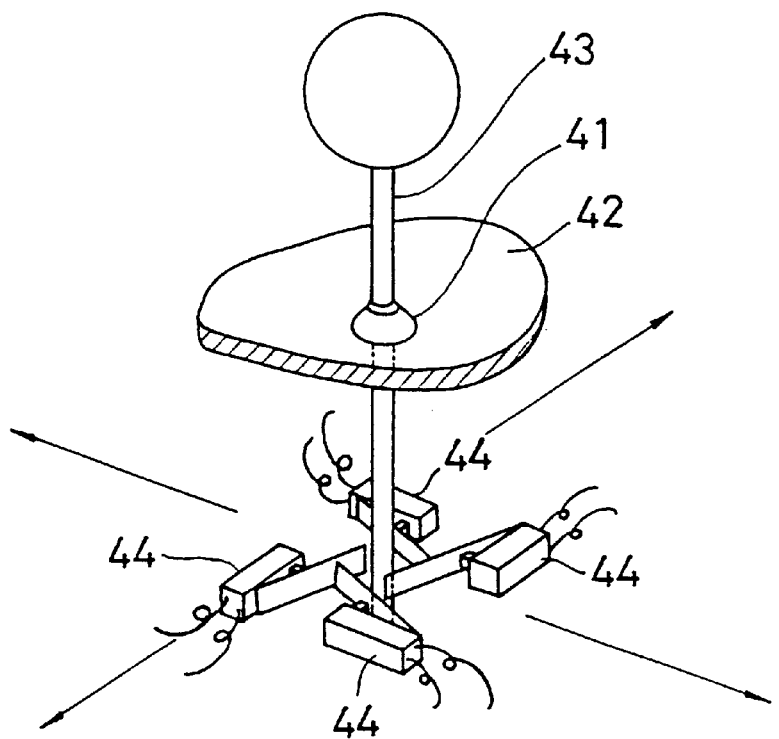
FIG. 1 if a fragmentary perspective view of a conventional joystick or manual control device.
Figure 2:
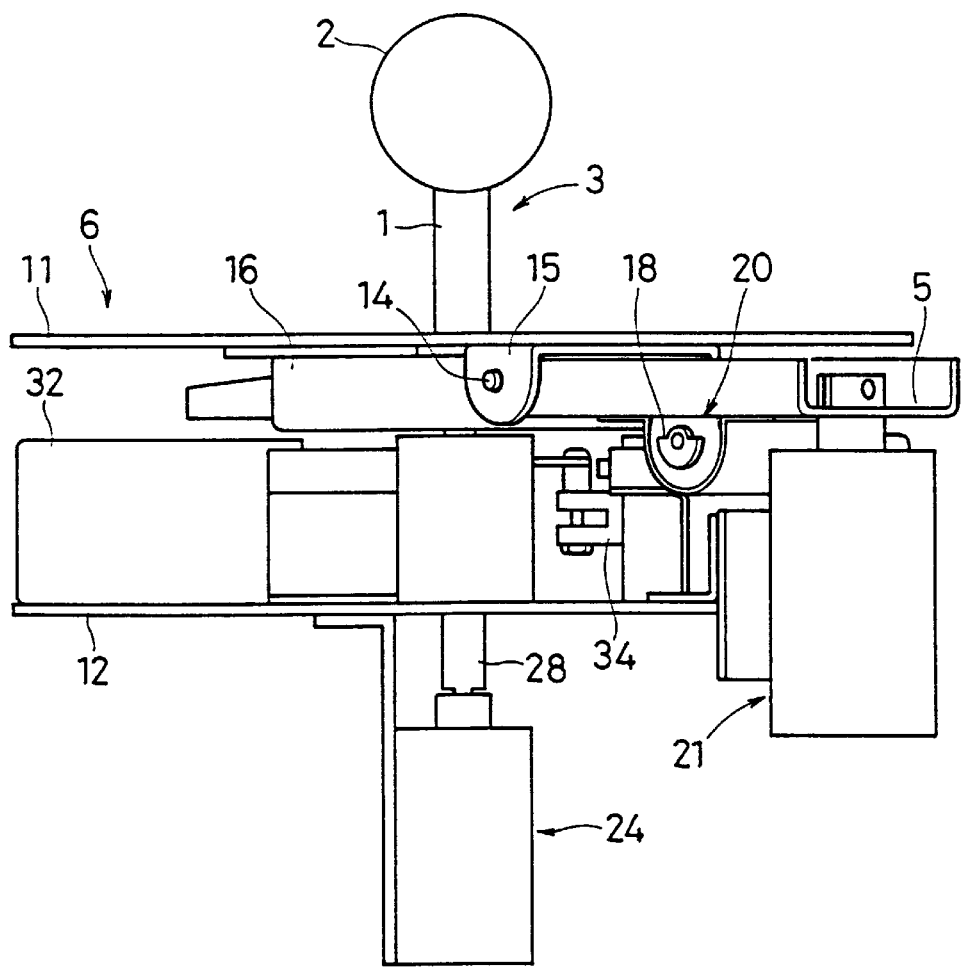
FIG. 2 is a front elevational view of a manual control device according to the present invention.
Figure 3:
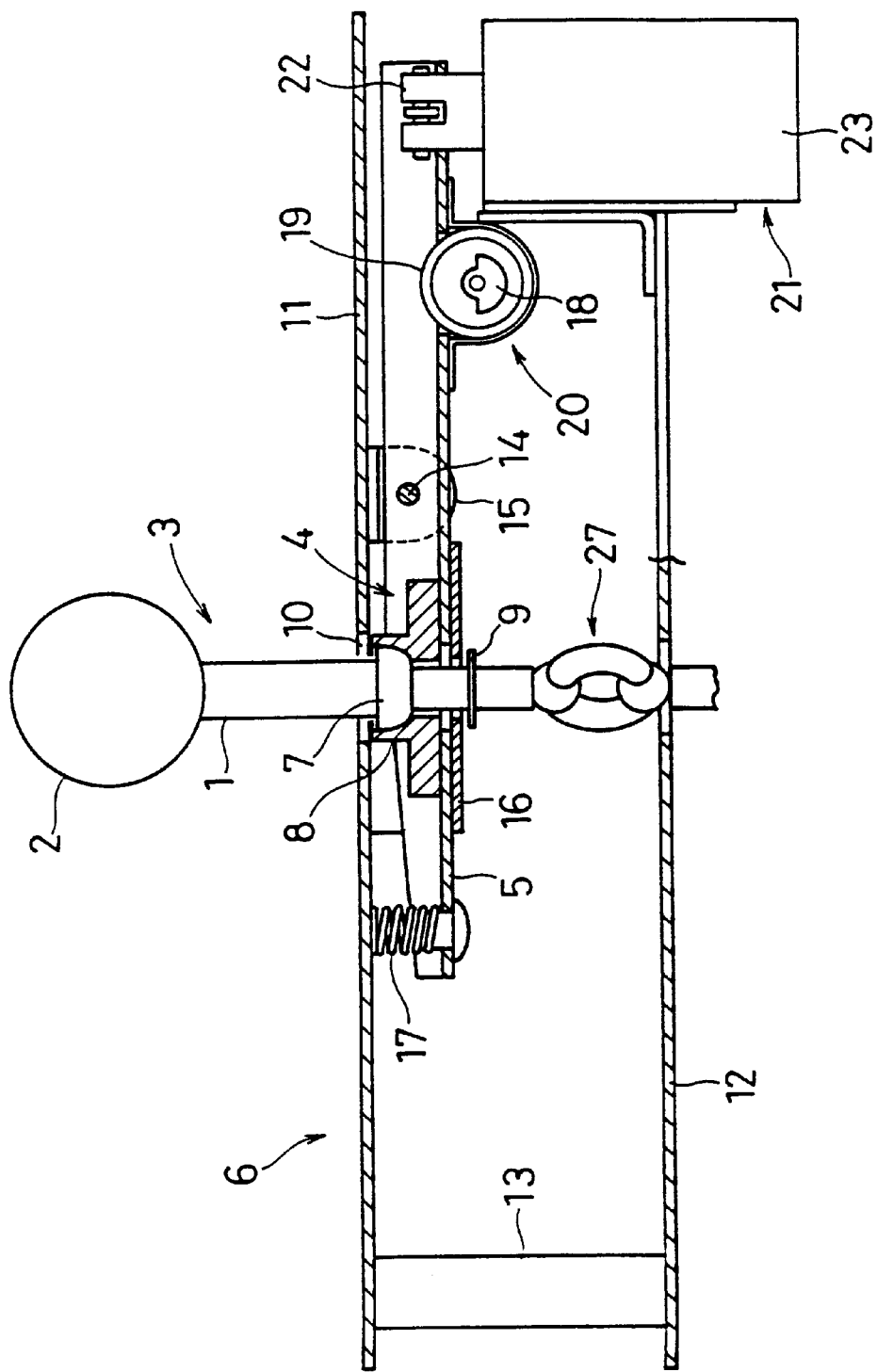
FIG. 3 is a vertical cross-sectional view of the manual control device shown in FIG. 2, showing first and second stimulus imparting mechanisms therein.

As shown in FIGS. 2 and 3, a manual control device according to the present invention, which is embodied as a joystick for use with a video game machine, generally comprises a control lever 3 having a shank 1 and a ball-shaped grip 2 on an upper end of the shank 1, a bearing 4 by which the shank 1 is tiltably supported on a horizontal support plate 5, and a device frame 6 in which the horizontal support plate 5 is mounted.

The bearing 4 comprises a boss 7 fixedly mounted on the shank 1 and a support base 8 mounted on an upper surface of the horizontal support plate 5. The boss 7 has a lower semispherical sliding surface slidably received in a semispherical recess defined in an upper surface of the support base 8. Therefore, the shank 1 is tiltably supported on the horizontal support plate 5 through the sliding engagement between the boss 7 and the support base 8. A retaining ring 9 is secured to the shank 1 at a position beneath the bearing 4 for holding the shank 1 in position against removal from the horizontal support plate 5.

The device frame 6 comprises an upper horizontal panel 11 having a hole 10 through which the shank 1 extends, a lower horizontal plate 12 spaced downwardly from the upper horizontal panel 11, and a joint bar 13 extending between and interconnecting the upper and lower horizontal panels 11, 12. The horizontal support plate 5 is swingably supported substantially at its central region, by a shaft 14 on a bracket 15 which is attached to a lower surface of the upper horizontal panel 11. A holder 16 which is also attached to the lower surface of the upper horizontal panel 11 provides a horizontal surface for maintaining the horizontal support plate 5 thereon.

A biasing element 17 comprising a helical compression spring is mounted on a front tip end of the horizontal support plate 5 and acts between the upper horizontal panel 11 and the horizontal support plate 5 for normally biasing the front tip end of the horizontal support plate 5 downwardly. The horizontal support plate 5 supports on its rear end portion remote from the front tip end a first stimulus imparting mechanism 20 which comprises a semicircular eccentric weight 18 rotatably supported on the horizontal support plate 5 and a rotary actuator 19 such as a DC motor or the like for rotating the semicircular eccentric weight 18.

The horizontal support plate 5 is normally held horizontally on the holder 16 by being biased downwardly at its front tip end by the biasing element 17. While a video game played on the video game machine is in progress, a controller (not shown) of the video game machine outputs a control signal depending on how the video game develops, and applies the control signal to the rotary actuator 19 to rotate the eccentric weight 18. The horizontal support plate 5 now vibrates, imparting vibrations to the control lever 3 for thereby giving a stimulative physical action to the game player.

The manual control device also has a second stimulus imparting mechanism 21 mounted on the lower horizontal panel 12 near the first stimulus imparting mechanism 20 for actuating downwardly the rear end of the horizontal support plate 5 remote from its front tip end thereby to swing the bearing 4 by which the control lever 3 is supported. The second stimulus imparting mechanism 21 comprises a plunger 22 made of a magnetic material which is coupled to the rear end of the horizontal support plate 5, and a swinging mechanism 23 comprising a solenoid for pulling the plunger 22 downwardly. The controller of the video game machine outputs a control signal depending on how the video game develops, and applies the control signal to the swinging mechanism 23 for pulling the rear end of the horizontal support plate 5 downwardly. The horizontal support plate 5 now swings about the shaft 14, pushing the bearing 4 and hence the control lever 3 upwardly thereby to impart a stimulative physical action to the game player.

Figure 4:
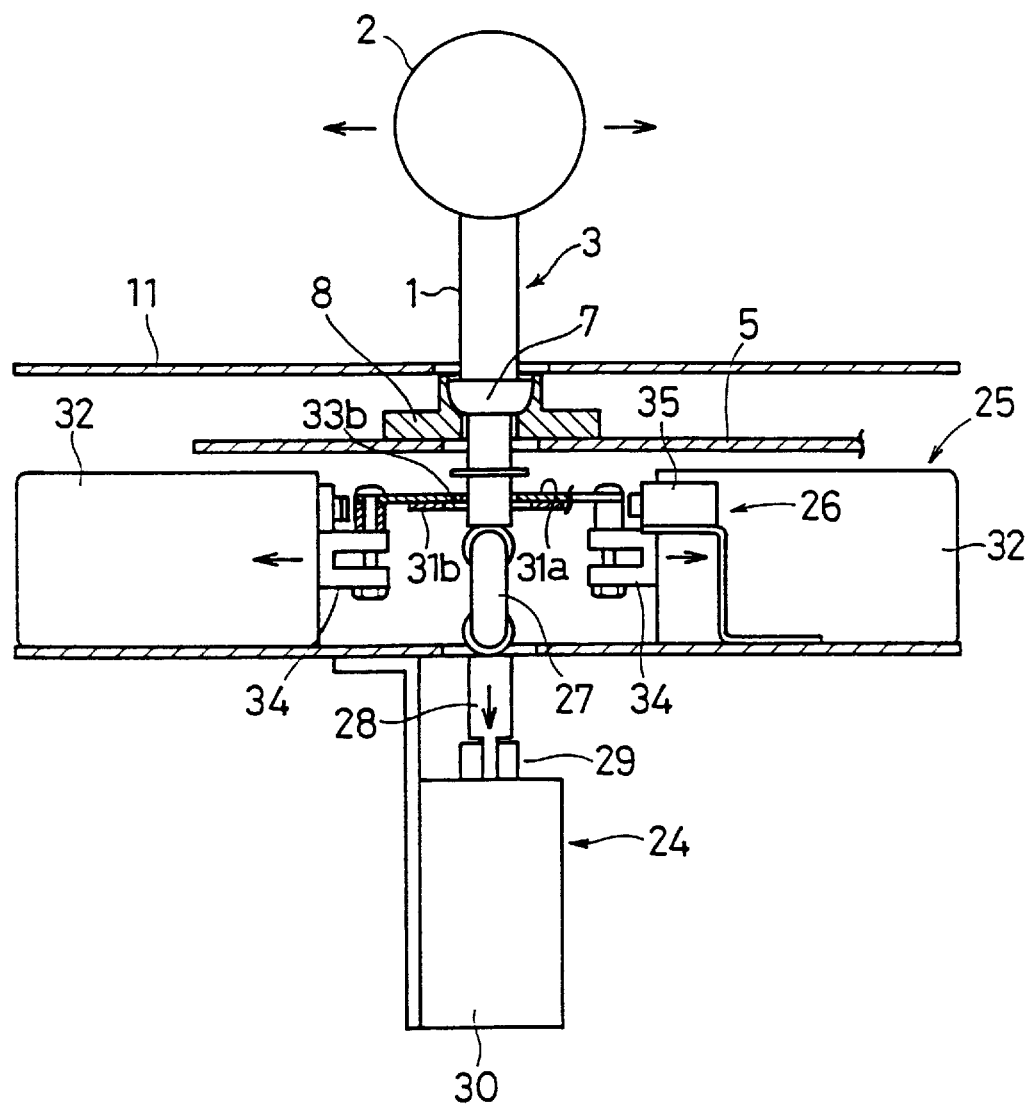
FIG. 4 is a vertical cross-sectional view of the manual control device shown in FIG. 2, showing a first resistance imparting mechanism therein.
Figure 5:
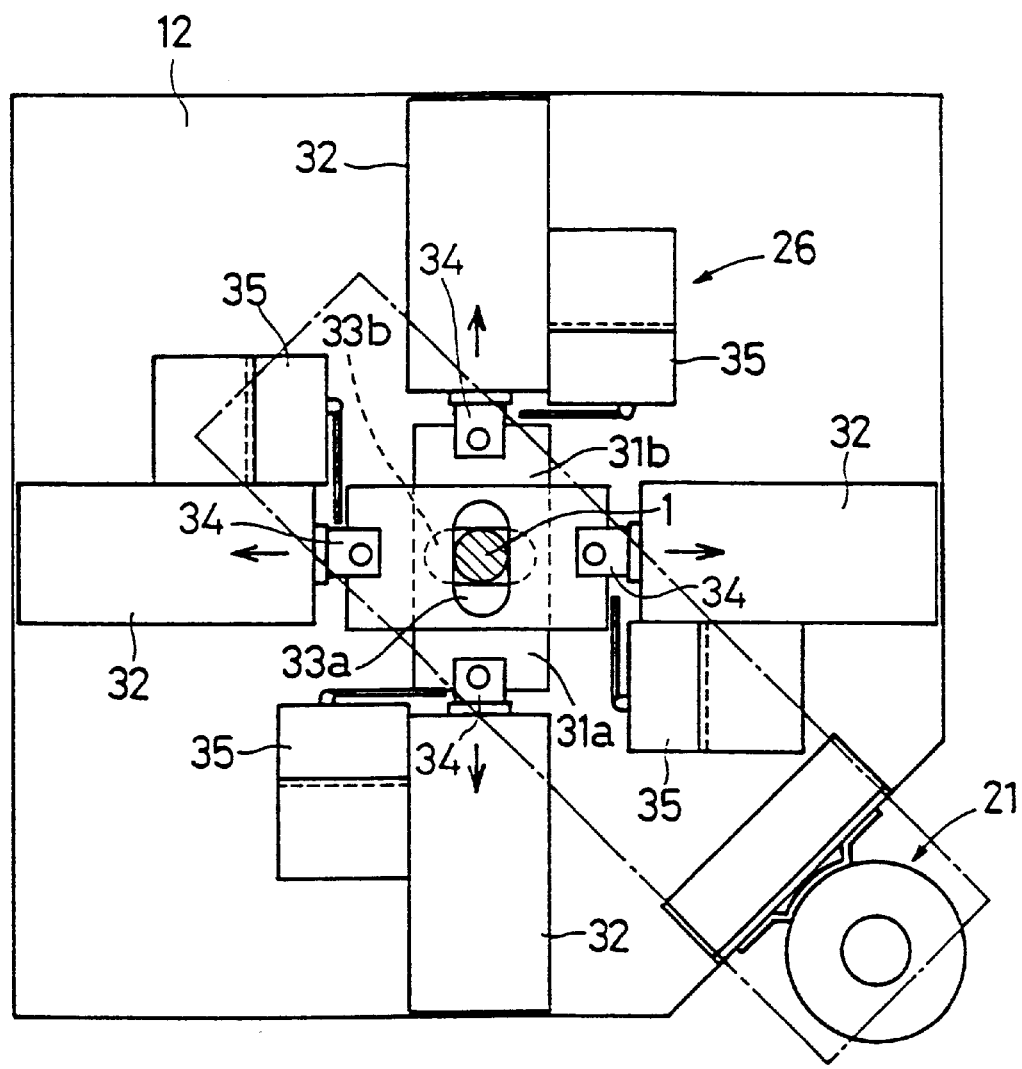
FIG. 5 is a plan view, partly in cross section, of the manual control device shown in FIG. 2, showing a second resistance imparting mechanism and a detecting mechanism.

As shown in FIGS. 4 and 5, the lower horizontal panel 12 supports thereon a first resistance imparting mechanism 24 for pulling the control lever 3 downwardly to impart a given resistance to the control lever 3 against its operation, a second resistance imparting mechanism 25 for pulling the shank 1 in directions to tilt the shank 1 to impart a resistance to the control lever 3 against its operation, and a detecting mechanism 26 for detecting a tilting displacement of the control lever 3.

The first resistance imparting mechanism 24 comprises a coupling 28 supported by a flexible joint 27 which comprises a ring connected to the lower end of the shank 1, and an actuating mechanism 30 comprising a solenoid mounted on the lower horizontal panel 12 for pulling downwardly a plunger 29 which is connected to a lower end of the coupling 28. The controller of the video game machine outputs a control signal depending on how the video game develops, and applies the control signal to the actuating mechanism 30 for pulling the coupling 28 downwardly. When the coupling 28 is pulled downwardly, the boss 7 on the shank 1 is pressed against the support base 8, imparting a given resistance, greater than a normal level of resistance, to the control lever 8 against its operation.

The second resistance imparting mechanism 25 comprises a pair of upper and lower slide plates 31*a*, 31*b* disposed vertically between the horizontal support plate 5 and the flexible joint 27 and operatively coupled to the shank 1, and four sliding mechanisms 32 which comprise respective solenoids mounted on the lower horizontal panel 12 and connected to opposite ends of the upper and lower slide plates 31*a*, 31*b*. The four sliding mechanisms 32 are disposed in 90°-spaced positions around the shank 1, and have respective plungers 34 connected to the opposite ends of the upper and lower slide plates 31*a*, 31*b*. Specifically, the opposite ends of the upper slide plate 31*a* are connected to the respective plungers 34 of the two sliding mechanisms 32 which are shown on left- and right-hand sides in FIG. 5, and the opposite ends of the lower slide plate 31*b* are connected to the respective plungers 34 of the two sliding mechanisms 32 which are shown in upper and lower positions in FIG. 5. The controller of the video game machine outputs a control signal depending on how the video game develops, and applies the control signal to a selected one of the sliding mechanisms 32 for pulling horizontally a corresponding one of the upper and lower slide plates 31*a*, 31*b*.

The upper and lower slide plates 31*a*, 31*b* have respective oblong slots 33*a*, 33*b* defined centrally therein which whose longitudinal axes extend perpendicularly to the axes of the sliding mechanisms 32 to which the upper and lower slide plates 31*a*, 31*b* are coupled. The shank 1 extends vertically through the oblong slots 33*a*, 33*b*. When one of the sliding mechanisms 32, e.g., the sliding mechanism 32 positioned on the left-hand side in FIG. 5, is operated by a control signal from the controller, the upper slide plate 31*a* is pulled to the left, urging the shank 1 below the bearing 4 to move along the oblong slot 33*b* in the lower slide plate 31*b* toward the sliding mechanism 32 positioned on the left-hand side. At this time, the grip 2 on the upper end of the shank 1 moves to the right. The control lever 3 can be moved independently of the sliding mechanisms 32 in the upper and lower positions within a range defined by the length of the oblong slots 33*a*, 33*b*.

The detecting mechanism 26 comprises four limit switches 35 mounted on the lower horizontal panel 12 adjacent to the respective sliding mechanisms 32. When the control lever 3 is manually tilted by the game player, the slide plates 31*a*, 31*b* slide into abutment against one or adjacent two of the limit switches 35, which produce a signal indicative of the direction in which the control lever 3 is tilted and output the signal to the controller of the video game machine.

The manual control device may typically be used as a joystick of a video game machine for playing a martial arts video game in which two displayed game characters fight against each other. Particularly, the manual control device may advantageously be used with a video game played by the game player or game players to control game characters displayed on a display monitor to fight against each other, as disclosed in Japanese laid-open patent publication No. 8-182860 or U.S. Pat. No. 4,491,324, for example.

Operation of the manual control device used as such a joystick will be described below.

At the start of the video game, the first and second stimulus imparting mechanisms 20, 21 and the first and second resistance imparting mechanisms 24, 25 are in their inactivated position.

When these mechanisms 20, 21, 24, 25 are in their inactivated position, the game player can tilt the control lever 3 with a light force in the same manner as with an ordinary joystick. As the control lever 3 is tilted, it turns on one or adjust two of the limit switches 35, which output signals to the controller. The controller then causes game characters displayed on the display monitor to move depending on the supplied signals.

When the game character controlled by the game player through the control lever 3 is attacked and damaged by the enemy game character which is controlled by the controller or another game player, at least one of the first and second stimulus imparting mechanisms 20, 21 is actuated to move the bearing 4, which imparts a stimulative physical action through the control lever 3 to the game player.

For example, when the game character controlled by the game player is attacked by successive blows from the enemy game character, the controller energizes the rotary actuator 19 of the first stimulus imparting mechanism 20 to rotate the eccentric weight 18 for a predetermined period of time depending on the successive blows. The rotation of the eccentric weight 18 vibrates the horizontal support plate 5, which transmits the vibrations through the control lever 3 to the hand of the game player. When the game character controlled by the game player is attacked by a deathblow from the enemy game character, the controller energizes the swinging mechanism 23 of the second stimulus imparting mechanism 21 to swing the horizontal support plate 5 about the shaft 14, thrusting the control lever 3 upwardly thereby to give a physical stimulus to the game player.

When the accumulated amount of damage caused to the game character controlled by the game player by the enemy game character exceeds a certain level, the controller operates the first resistance imparting mechanism 24 to impart a certain resistance to the control lever 3, which now requires increased forces in order to be tilted. When the game character controlled by the game player is attacked by a throw or push in a certain direction from the enemy game character, the controller actuates the sliding mechanism 32 of the second resistance imparting mechanism 25 which is positioned in that certain direction for thereby swinging the control lever 3 in the same direction and increasing a resistance against forces tending to operate the control lever 3 in a direction opposite to that direction.

As described above, the first and second stimulus imparting mechanisms 20, 21 are operated to move the control lever 3 depending on how the video game develops. The control lever 3 actuated by the first and second stimulus imparting mechanisms 20, 21 can directly give the game player stimulative information through a physical action through a relatively simple structure. The game player can feel highly realistic about the video game being played based on both visual information provided images displayed on the display screen of the video game machine and physical stimuli produced by the control lever 3 and applied to the hand of the game player.

In the illustrated embodiment, the first stimulus imparting mechanism 20 comprises the eccentric weight 18 rotatably supported on the horizontal support plate 5 and the rotary actuator 19 for rotating the eccentric weight 18. Depending on how the video game develops, the horizontal support plate 5 is vibrated by the eccentric weight 18 which is rotated by the rotary actuator 19, and the vibrations of the horizontal support plate 5 are transmitted through the control lever 3 to the hand of the game player. Consequently, the hand of the game player is given physical stimuli depending on how the video game develops. When the period of time in which the rotary actuator 19 is operated is varied, the stimulative information transmitted from the control lever 3 to the game player can easily be controlled with accuracy.

Furthermore, the second stimulus imparting mechanism 21 comprises the swinging mechanism 23 for swinging the horizontal support plate 5. Depending on how the video game develops, the swinging mechanism 23 is actuated to swing the horizontal support plate 5 about the shaft 14, thrusting upwardly the bearing 4 and hence the control lever 3. Such an upward movement of the control lever 3 enables the game player to recognize for sure the fact that the game character controlled by the game player is greatly damaged.

The swinging mechanism 23 may be operated to lift the rear end of the horizontal support plate 5 for thereby lower the bearing 4 and hence the control lever 3.

In the above embodiment, the first and second resistance imparting mechanisms 24, 25 are provided to impart variable resistances to the control lever 3 against its operation depending on how the video game develops while it is being played. The variable resistances imparted to the control lever 3 give the game player accurate information as to resistive forces that are being applied to the control lever 3 against manual forces applied by the game player to move the control lever 3. Therefore, the game player feels very realistic about certain actions in the video game being played which are being felt through the control lever 3.

Specifically, the first resistance imparting mechanism 24 comprises the coupling 28 coupled through the flexible joint 27 to the lower end of the shank 1, and the actuating mechanism 30 for pulling downwardly the lower end of the coupling 28. The controller operates the actuating mechanism 30 depending on how the video game develops, imparting a certain resistance of the control lever 3 to vary forces required to operate the control lever 3. The game player can thus easily recognize through the control lever 3 the fact that the accumulated amount of damage caused to the game character controlled by the game player exceeds a certain level.

The lower end of the control lever 3 is coupled to the actuating mechanism 30 through the flexible joint 27 and the coupling 28. When the first resistance imparting mechanism 24 is inactivated, the control lever 3 can manually be operated without being impaired by the first resistance imparting mechanism 24. When the first resistance imparting mechanism 24 is actuated, it imparts a certain resistance to the control lever 3 against its operation.

The resistance imparted from the first resistance imparting mechanism 24 to the control lever 3 may be varied stepwise or linearly such that the resistance will increase as the accumulated amount of damage caused to the game character controlled by the game player increases. With such a modification, the game player is given varying information accurately indicative of changes in the ease with which the control lever 3 is manually operated.

The second resistance imparting mechanism 25 comprises the slide plates 31a, 31b and the sliding mechanisms 32 for pulling the slide plates 31a, 31b in a direction in which the control lever 3 is manually tilted. Depending on the development of the video game, the controller actuates one of the sliding mechanisms 32 to pull one of the slide plates 31a, 31b in a direction opposite to the direction in which the game character controlled by the game player is attacked by the enemy character. Since the grip 2 moves in the direction in which the game character controlled by the game player is attacked by the enemy character, the game player can accurately recognize the direction in which the game character controlled by the game player is attacked by the enemy character. At the same time, the pulled one of the slide plates 31a, 31b imparts forces to the control lever 3, tending to resist manual forces which are applied by the game player to move the control lever 3 in an opposite direction.

The forces applied to actuate the sliding mechanisms 32 may be varied stepwise or linearly such that the ease with which the control lever 3 is operated will vary depending on the magnitude of damage caused to the game character controlled by the game player.

Figure 6:
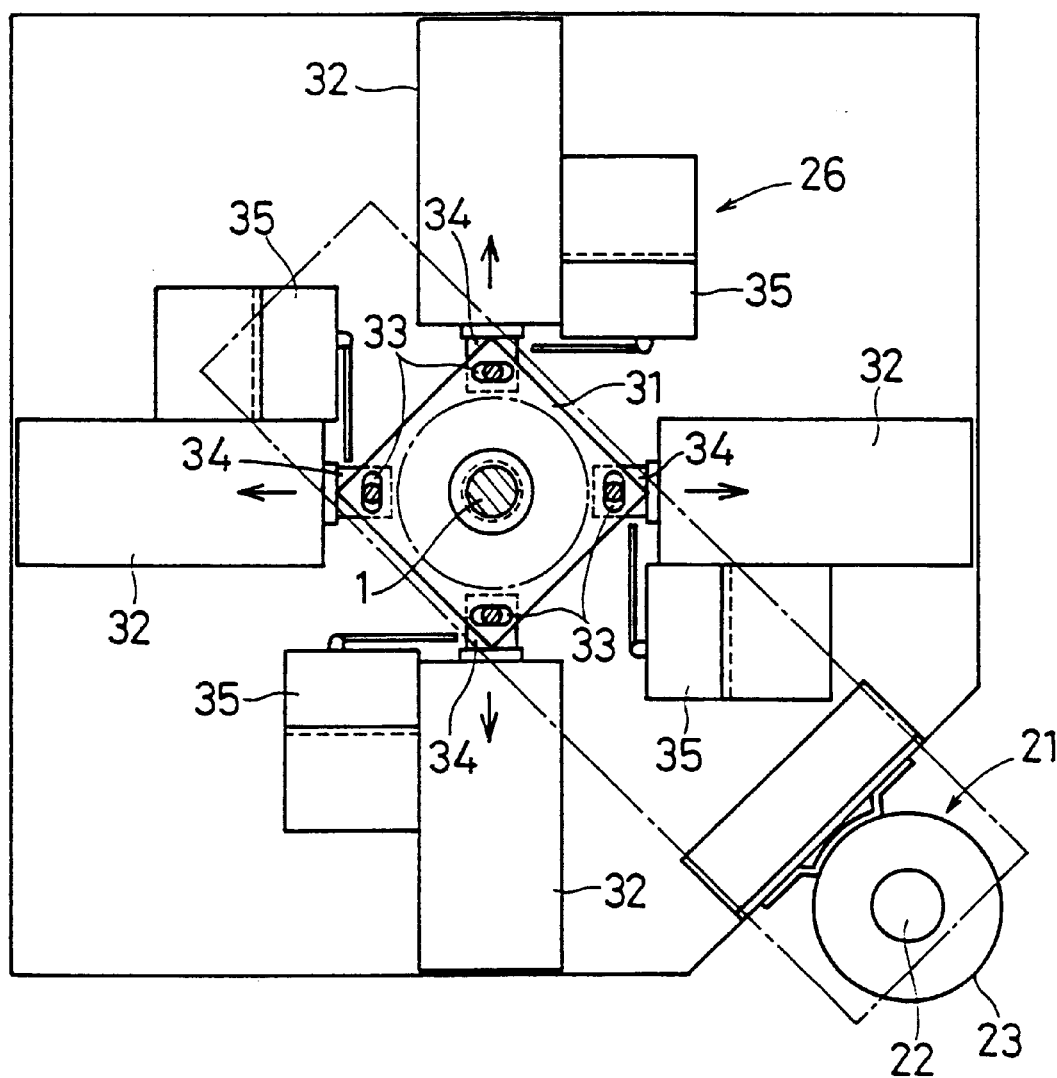
FIG. 6 is a plan view, partly in cross section, of an alternative second resistance imparting mechanism.

FIG. 6 shows an alternative second resistance imparting mechanism which comprises a single square slide plate 31 whose four corners are coupled to the respective plungers of the four sliding mechanisms 32. While the video game is being played, the controller of the video game machine outputs a control signal depending on how the video game develops, and applies the control signal to operate one or two of the sliding mechanisms 32 to pull the slide plate 31 in a horizontal direction.

Specifically, as shown in FIG. 6, the square slide plate 31 has four oblong slots 33 defined in the respective corners thereof and having respective axes extending perpendicular to the diagonal lines of the square slide plate 31. The plungers 34 of the respective sliding mechanisms 32 are operatively coupled to the respective corners of the slide plate 31 through the oblong slots 33. The shank 1 extends centrally through the slide plate 31. The oblong slots 33 allow the slide plate 31 to be moved by one of the sliding mechanisms 32 independently of other sliding mechanisms 32 within a range defined by the length of the oblong slots 33. Other details of the second resistance imparting mechanism shown in FIG. 6 are identical to those of the second resistance imparting mechanism shown in FIGS. 4 and 5.

When one of the sliding mechanisms 32 is operated by the controller, the plunger 34 thereof is pulled to move the slide plate 31 toward the operated sliding mechanism 32. The shank 1 of the control lever 3 below the bearing 4 is also shifted toward the operated sliding mechanism 32 thereby to move the grip 2 in the opposite direction, indicating to the game player that the game character controlled by the game player is attacked in the same direction. At the same time, the operated sliding mechanism 32 imparts resistive forces to the control lever 3, tending to resist manual forces which are applied by the game player to move the control lever 3 in an opposite direction.

The square slide plate 31 is positioned below the bearing 4. However, the square slide plate 31 may be positioned above the bearing 4 to cause an operated one of the sliding mechanisms 32 to move the grip 2 toward the operated one of the sliding mechanisms 32 and also impart resistive forces tending to resist manual forces applied by the game player in a direction away from the operated one of the sliding mechanisms 32.

In the embodiment shown in FIG. 6, when the control lever 3 is tilted, the slide plate 31 is displaced into abutment against one or adjacent two of the limit switches 35, which detect the tilting displacement of the control lever 3. However, tilting displacements of the control lever 3 may be detected by detectors such as limit switches which are engageable by the shank 1 of the control lever 3.

The manual control device according to the present invention may be used as any of various control devices including a gear shift device of a driving game machine, rather than a joystick of a video game machine for playing a martial arts game or a shooting game. If the manual control device is used as a gear shift device of a driving game machine, then the first and second stimulus imparting mechanisms 20, 21 may be actuated when a car displayed on the display screen of the driving game machine is vibrated or shocked by a driving course, causing the control lever 3 to transmit terrain information of the driving course to the game player.

When the displayed car collides with an obstacle and is damaged thereby, the first resistance imparting mechanism 24 may be actuated to impart resistive forces to the control lever 3. When the display car is making a turn, the second resistance imparting mechanism 25 may be actuated to impart resistive forces to the control lever 3 in a certain direction. In this manner, various items of information depending on how the video game develops can effectively be transmitted to the game player.

Although certain preferred embodiments of the present invention have been shown and described in detail, it should be understood that various changes and modifications may be made therein without departing from the scope of the appended claims.

What is claimed is:

1. A manual control device for use with a amusement machine, comprising:

a support structure;

a control lever;

a bearing tiltably mounting said control lever on said support structure;

a detecting mechanism for detecting a tilting displacement of said control lever;

a stimulus imparting mechanism actuatable, depending on how a video game played on the amusement machine by a game player develops, for moving said control lever to impart a stimulus through the control lever to the game player of the video game; and a resistance imparting mechanism actuatable, depending on how the video game played on the amusement machine by the game player develops, for imparting resistive forces to said control lever against forces applied by the game player to move said control lever.

2. A manual control device according to claim 1, wherein said stimulus imparting mechanism comprises an eccentric weight rotatably supported on said support plate and a rotary actuator mounted on said support plate for rotating said eccentric weight.

3. A manual control device according to claim 1, wherein said stimulus imparting mechanism comprises a shaft, said support plate being swingably supported by said shaft, and a swinging mechanism for swinging said support plate about said shaft.

4. A manual control device according to claim 1, wherein said resistance imparting mechanism comprises a coupling connected to a lower end of said control lever through a flexible joint, and an actuating mechanism for pulling said coupling downwardly to press said control lever against said bearing.

5. A manual control device according to claim 1, wherein said resistance imparting mechanism comprises a slide plate operatively coupled to said control lever and a sliding mechanism for pulling said slide plate in a direction to tilt said control lever.

6. A manual control device for controlling a displayed element in a video game played by a game player on a amusement machine, comprising:

a tiltable control lever manually operable by the game player of the video game;

a detecting mechanism for detecting a tilting displacement of said control lever to control the displayed element;

a stimulus imparting mechanism actuatable, depending on how the video game played by the game player develops, for imparting a stimulative physical action to said manually operable control lever; and a resistance imparting mechanism actuatable, depending on how the video game played by the game player develops, for imparting resistive forces to said manually operable control lever against manual forces applied by the game player to move said control lever.

7. A manual control device according to claim 6, further comprising a frame and a support plate mounted on said frame, a bearing tiltable supporting said control lever on said support plate, said detecting mechanism, said stimulus imparting mechanism, and said resistance imparting mechanism being mounted on said frame.

8. A manual control device according to claim 7, wherein said stimulus imparting mechanism comprises an eccentric weight rotatably supported on said support plate and a rotary actuator mounted on said support plate for rotating said eccentric weight.

9. A manual control device according to claim 7, wherein said stimulus imparting mechanism comprises a shaft fixedly mounted in said frame, said support plate being swingably supported by said shaft, and a swinging mechanism for swinging said support plate about said shaft.

10. A manual control device according to claim 7, wherein said resistance imparting mechanism comprises a coupling connected to a lower end of said control lever through a flexible joint, and an actuating mechanism for pulling said coupling downwardly to press said control lever against said bearing.

11. A manual control device according to claim 7, wherein said resistance imparting mechanism comprises a slide plate operatively coupled to said control lever and a sliding mechanism for pulling said slide plate in a direction to tilt said control lever.

12. A manual control device according to claim 1 wherein said stimulus imparting mechanism comprises a support plate operable to impart a stimulus to the control lever, said support plate being actuatable to impart said stimulus to the control lever separately from the actuation of said resistance imparting mechanism to impart said resistive forces to said control lever.

13. A manual control device according to claim 6 wherein said stimulus imparting mechanism comprises a support plate operable to impart a stimulus to the control lever, said support plate being actuatable to impart said stimulus to the control lever separately from the actuation of said resistance imparting mechanism to impart said resistive forces to said control lever.

14. A manual control device according to claim 1 wherein said resistance imparting mechanism is actuatable to impart said resistive forces to the control lever separately from the actuation of said stimulus imparting mechanism to impart said stimulus to said control lever.

15. A manual control device for use with a amusement machine, comprising:
    a support plate;
    a control lever movable to a plurality of displaced positions;
    a bearing movably supporting said control lever on said support plate;
    a detecting mechanism for detecting displaced positions of said control lever; and
    a stimulus imparting mechanism for moving said control lever to impart a stimulus through the control lever, said stimulus imparting mechanism being actuatable depending on the development of the video game played on the amusement machine;
    said stimulus imparting mechanism comprising a vibration device on said support plate, said vibration device being actuated independently of the displaced position of the control lever; and
    a resistance imparting mechanism for imparting resistance to the control lever depending on another development of the video game played on the amusement machine.

16. A manual control device according to claim 15 wherein said vibration device includes an eccentric weight rotatably supported on said support plate and a rotary actuator mounted on said support plate for rotating said eccentric weight.

17. A manual control device for use with a amusement machine, comprising:
    a frame;
    a support plate on said frame;
    a control lever having a longitudinal axis;
    a bearing movably supporting said control lever on said support plate;
    a detecting mechanism for detecting movement of said control lever; and
    a stimulus imparting mechanism for moving said control lever to impart a stimulus through the control lever, said stimulus imparting mechanism being actuatable depending on the development of the video game played on the amusement machine;
    said stimulus imparting mechanism comprising a shaft on said frame, said shaft having a pivot axis generally perpendicular to said longitudinal axis of said control lever, said support plate being pivotably supported by said shaft, and a swinging mechanism for pivoting said support plate about said shaft; and
    a stimulus imparting mechanism for imparting stimulus to the control lever depending on another development of the video game played on the amusement machine.

18. A manual control device according to claim 17, wherein said resistance imparting mechanism comprises a slide plate operatively coupled to said control lever and a sliding mechanism for pulling said slide plate in a direction to tilt said control lever.

19. A manual control device for use with a amusement machine on which a video game is played by a player, comprising:
    a support structure;
    a control lever moveable to a plurality of positions;
    a bearing movably supporting said control lever on said support structure;
    a detecting mechanism for detecting movement of said control lever; and
    a resistance imparting mechanism for imparting resistance forces to said control lever against forces applied by said player to move said control lever, said resistance imparting mechanism being actuatable depending on the development of the video game played by the player on the amusements machine;
    said resistance imparting mechanism comprising a pulling device for pulling said control lever downwardly to press said control lever against said bearing; and
    a stimulus imparting mechanism for imparting stimulus to the control lever depending on another development of the video game played on the amusement machine.

20. A manual control device according to claim 19 wherein said pulling device includes a coupling and a flexible joint between said control lever and said support structure, said pulling device further comprising an actuating mechanism for pulling said control lever downwardly to press said control lever against said bearing.

21. A manual control device for use with a amusement machine, comprising:
    a frame;
    a support plate;
    a pivot device pivotably supporting said support plate on said frame;
    a control lever moveable to a plurality of positions;
    a bearing movably supporting said control lever on said support plate;
    a stimulus imparting mechanism for moving said control lever to impart a stimulus through the control lever, said stimulus imparting mechanism being actuatable depending on the development of the video game played on the amusement machine;

said stimulus imparting mechanism comprising an eccentric weight rotatably supported on said support plate and a rotary actuator mounted on said support plate for rotating said eccentric weight; and a resistance imparting mechanism for imparting resistance to the control lever depending on another development of the video game played on the amusement machine.

22. A manual control device according to claim 21 wherein said bearing has a bearing part disposed at one location on said support plate, said eccentric weight being mounted on another location of said support plate, said pivot device being disposed between said one and said another location.

23. A manual control device according to claim 21 wherein said stimulus imparting mechanism further comprises an operable device connected to said support plate for effecting pivotable movement of said support plate about said pivot axis.

24. A manual control device according to claim 22 wherein said bearing has one part mounted on said support plate and another part mounted on said control lever, said pivotal movement of said support plate effecting displacement of said first and second bearing parts relative to said frame.

25. A manual control device according to claim 22 wherein said stimulus imparting mechanism further comprises a biasing device between said frame and said support plate for biasing said support plate in one pivotal direction.

26. A manual control device according to claim 22 wherein said pivotal movement of said support plate effects displacement of said control lever relative to said frame.

27. A manual control device according to claim 22 wherein said frame has a frame part having an opening juxtaposed to said control lever, said bearing having a bearing part on said control lever, said bearing part being spaced from said frame part a first distance when said support plate is in one pivotal position, said bearing part being spaced from said frame part another distance when said support plate is in another pivotal position.

28. A control device for use with an amusement machine on which a video game is played by a player, comprising:

a support structure;

a control lever moveable to a plurality of displaced portions;

a bearing movably supporting said control lever on said support structure;

a detecting mechanism for detecting movement of said control lever; and a stimulus imparting mechanism for moving said control lever to impart a stimulus through the control lever;

said stimulus imparting mechanism being actuated depending on the development of the video game played by the player on said amusement machine, said stimulus imparting mechanism being actuated regardless of what displaced position the control lever happens to be when said actuation of said stimulus imparting mechanism occurs; and a resistance imparting mechanism for imparting resistance to the control lever depending on another development of the video game played on the amusement machine.

29. A manual control device according to claim 28 wherein said support structure includes a support plate, said bearing including a first bearing part on said support plate and a second bearing part on said control lever, said stimulus imparting mechanism includes a first device for vibrating said bearing which in turn vibrates said control lever, said stimulus imparting mechanism further comprising a second device for displacing said bearing between a raised position and a lowered position which in turn displaces said control lever between a raised position and a lowered position.

30. A manual control device according to claim 28 wherein said support structure includes a support plate, said bearing including a first bearing part on said support plate and a second bearing part on said control lever, said resistance imparting mechanism varying the resistance between said first and second bearing parts which in turn varies the force to be applied to the control lever to move said control lever to said plurality of displaced positions.

31. A manual control device according to claim 28 wherein said resistance imparting mechanism is mounted on said support structure and engageable with said control lever to limit the displaceable positions to which said control lever is moveable by the player of the video game.

32. A manual control device according to claim 31 wherein said resistance imparting mechanism is operable to vary the displaceable positions to which said control lever is limited by the player of the video groove.

* * * * *